R. C. HULL.
ELECTRICAL SYSTEM OF DISTRIBUTION.
APPLICATION FILED JULY 28, 1911.
1,120,148.
Patented Dec. 8, 1914.
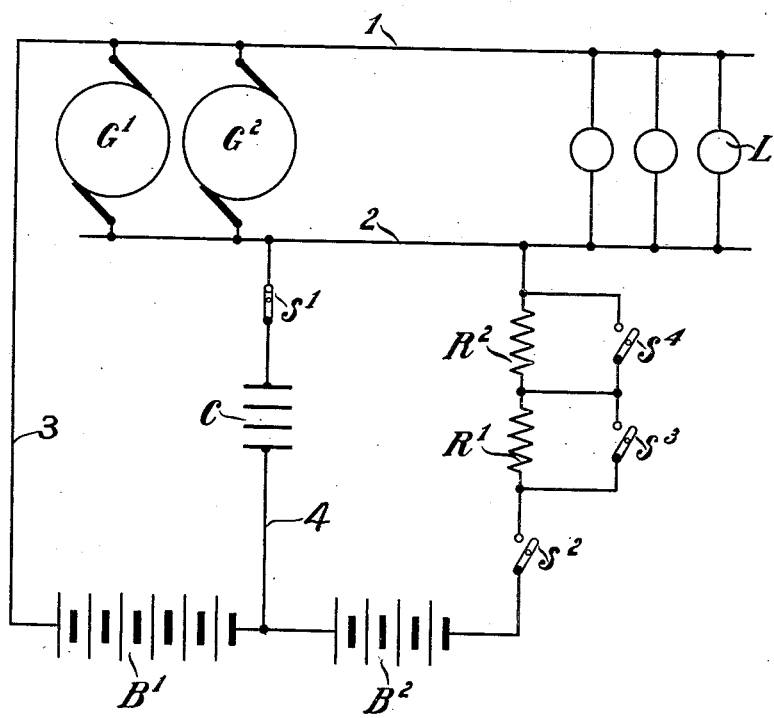

UNITED STATES PATENT OFFICE.

ROBERT C. HULL, OF PHILADELPHIA, PENNSYLVANIA, ASSIGNOR TO THE ELECTRIC STORAGE BATTERY COMPANY, OF PHILADELPHIA, PENNSYLVANIA, A CORPORATION OF NEW JERSEY.

ELECTRICAL SYSTEM OF DISTRIBUTION.

1,120,148.   Specification of Letters Patent.   Patented Dec. 8, 1914.

Application filed July 28, 1911. Serial No. 641,048.

*To all whom it may concern:*

Be it known that I, ROBERT C. HULL, a citizen of the United States, and a resident of Philadelphia, in the county of Philadelphia, State of Pennsylvania, have invented certain new and useful Improvements in Electrical Systems of Distribution, of which the following is a specification.

My invention relates to systems in which a storage battery is employed primarily to maintain a supply of current in the case of failure of the usual source of power, and is particularly applicable to systems in which a direct current circuit is employed, whose voltage varies from time to time, and one of the principal objects of my invention is to provide means for preventing a storage battery when connected to such a circuit from being subjected to continual alternations of charge and discharge due to the changes of voltage on the circuit, and at the same time render the battery effective in supplying current to the system in case of abnormal drop in voltage, this result being accomplished in accordance with my invention with simple and inexpensive apparatus, and a minimum of attendance.

My invention will be more clearly understood by reference to the following description in connection with the accompanying drawing, in which—

1 and 2 are the conductors of an electric circuit to which current is supplied by the dynamos $G^1$ and $G^2$ for feeding the translating devices L. A storage battery is shown divided into two sections, $B^1$ and $B^2$, of which $B^1$ is the main battery, while $B^2$ is a group of end cells which may be thrown into circuit in series with the main battery to compensate for the drop in voltage during discharge. Normally the main battery $B^1$ is connected across the circuit 1—2 by means of conductors 3 and 4. In series with conductor 4 is shown a group of counter electromotive force cells C and a switch $S^1$. These counter electromotive force cells are constructed by immersing two like metallic electrodes, such as plates of platinum or lead, in a suitable electrolyte, such as dilute sulfuric acid, and differ from storage battery cells in the fact that they have no capacity. The application of electromotive force in either direction across their terminals will develop in them a counter electromotive force equal to the applied electromotive force, thus preventing a flow of current, until the applied electromotive force reaches a certain critical value. An increase of applied electromotive force beyond this value will not create any greater counter electromotive force in the cells and a flow of current will result. The internal resistance of these cells may be made comparatively low so that after the critical value of the electromotive force is reached, a small increase of applied electromotive force will produce a very considerable increase in the flow of current. The number of cells in the main battery $B^1$ is so chosen that the floating voltage of this portion of the battery is equal to the mean voltage across the conductors 1—2, and the number of electromotive force cells C is so designed that their critical voltage is greater than the normal variation of voltage across the conductors 1—2 on either side of the mean. Under these conditions the maximum normal voltage across the conductors 1—2 will not be sufficient to produce a flow of current through the counter electromotive force cells into the battery in the charge direction, and the minimum normal voltage across the conductors 1—2 will not be sufficient to permit a flow of current from the battery through the counter electromotive force cells in the discharge direction.

The number of cells in the group $B^2$ may be so chosen that when the entire battery consisting of the main battery $B^1$ and the end cells $B^2$ is discharging in series at the maximum rate, the voltage will be suitable for supplying the circuit 1—2. Connection is made from the group of cells $B^2$ to the conductor 2 by means of a switch $S^2$ through two resistances $R^1$ and $R^2$ connected in series. Two switches $S^3$ and $S^4$ are shown arranged to short circuit these two resistances respectively.

The operation of the system as thus described will then be as follows: Under normal conditions the switch $S^2$ will be opened, and the switch $S^1$ will be closed, and by reason of the counter cells C, as described above, the battery will neither charge nor discharge with the ordinary variation of voltage across the circuit 1—2. If, however, the voltage across this circuit should fall to an abnormally low point, as would be the case if the dynamos $G^1$ and $G^2$ were disconnected, or should fail for any reason, as soon as the voltage across the circuit 1—2 reaches a value equal to the voltage of the battery $B^1$ minus the critical voltage of the counter electromotive force cells C, the battery will begin to discharge through the latter cells to supply current to the load L. While the voltage of this supply will be abnormally low, it will prevent the supply of current from being wholly interrupted, and this result is accomplished automatically without depending upon the presence of an attendant, or the operation of an automatic switch. The switch $S^2$ can then be closed, and the switch $S^1$ opened whereupon the voltage supplied to the circuit 1—2 will be restored approximately to normal, and as the voltage of the battery drops off with further discharge, the resistances $R^1$ and $R^2$ may be short-circuited by the switches $S^3$ and $S^4$, thus maintaining suitable voltage on the circuit 1—2.

It will be obvious that modifications in the system described may be made without departing from the spirit of the invention.

What I claim, therefore, and desire to secure by Letters Patent is—

1. The combination of a dynamo, a work circuit directly connected thereto and subject to normal and abnormal variations of voltage, translating devices directly connected to the work circuit, a storage battery connected across the work circuit and a source of counter-electro-motive-force between the battery and the work circuit of sufficient electro-motive-force to prevent a flow of current through said source between the battery and the work circuit in either direction under normal variations of voltage on said work circuit, and to permit a flow of current through said source from the battery to the work circuit upon abnormal reduction of voltage on the work circuit.

2. The combination of a dynamo, a work circuit directly connected thereto and subject to normal and abnormal variations of voltage, translating devices directly connected to the work circuit, a storage battery connected across the work circuit, counter-electro-motive-force cells between the battery and the work circuit of sufficient electro-motive-force to prevent a flow of current through said cells between the battery and the work circuit in either direction under normal variations of voltage on said work circuit, and to permit a flow of current through said cells from the battery to the work circuit upon abnormal reduction of voltage on the work circuit.

3. In combination, an electric circuit subject to normal and abnormal variations of voltage, a storage battery connected thereto, a suitable number of counter electromotive force cells interposed between the battery and the circuit to prevent the battery from charging and discharging under normal variations of circuit voltage, but permit it to discharge upon abnormal reduction of circuit voltage, a group of end cells, means for connecting the end cells in series between the battery and the circuit, and means for thereafter cutting out the counter electromotive force cells.

4. In combination, an electric circuit subject to normal and abnormal variations of voltage, a storage battery connected thereto, a suitable number of counter-electro-motive force cells interposed between the battery and the circuit, to prevent the battery from charging and discharging under normal variations of circuit voltage, but permit it to discharge upon abnormal reduction of circuit voltage, a group of end cells, a regulating resistance, means for connecting the end cells and resistance in series between the battery and the circuit, means for thereafter cutting out the counter-electro-motive force cells, and means for thereafter short-circuiting the resistance.

In testimony whereof I have hereunto signed my name.

ROBERT C. HULL.

Witnesses:
  J. H. TRACY,
  R. A. WHETSTONE, Jr.